United States Patent
Panaioli et al.

(10) Patent No.: US 6,261,614 B1
(45) Date of Patent: Jul. 17, 2001

(54) FROZEN FOOD PRODUCT

(75) Inventors: Sandro Panaioli; Antonio Cocco, both of Cisterna de Latina (IT)

(73) Assignee: Gorton's, division of Conopco, Inc., Gloucester, MA (US)

( * ) Notice: Subject to any disclaimer, the term of this patent is extended or adjusted under 35 U.S.C. 154(b) by 0 days.

(21) Appl. No.: 09/345,118

(22) Filed: Jul. 6, 1999

(30) Foreign Application Priority Data

Jul. 6, 1998 (EP) .................................................. 98305344

(51) Int. Cl.[7] .............................. A23L 1/325; A23P 1/08
(52) U.S. Cl. .................................. 426/99; 426/92; 426/96; 426/100; 426/291; 426/293; 426/303; 426/304; 426/643
(58) Field of Search .................... 426/291, 293, 426/303, 99, 100, 92, 96, 643, 304

(56) References Cited

U.S. PATENT DOCUMENTS

| | | | |
|---|---|---|---|
| 2,910,370 | 10/1959 | Rogers et al. | 99/194 |
| 3,078,172 | 2/1963 | Libby | 99/192 |
| 3,514,294 * | 5/1970 | Klug | 426/291 |
| 3,653,924 * | 4/1972 | Penton | 426/293 |
| 4,199,603 | 4/1980 | Sortwell | 426/92 |
| 4,283,425 * | 8/1981 | Yuan | 426/303 |
| 4,640,837 * | 2/1987 | Coleman | 426/99 |
| 4,663,175 * | 5/1987 | Werner | 426/303 |
| 4,741,933 * | 5/1988 | Larsson | 426/291 |
| 4,744,994 * | 5/1988 | Bernacchi | 426/293 |
| 4,764,386 * | 8/1988 | Bernacchi | 426/293 |
| 4,781,930 * | 11/1988 | Fraser | 426/293 |
| 4,808,423 * | 2/1989 | Hansson | 426/293 |
| 4,919,953 * | 4/1990 | Palmlin | 426/293 |
| 4,943,438 * | 7/1990 | Rosenthal | 426/303 |
| 5,008,121 * | 4/1991 | Bernacchi | 426/303 |
| 5,262,185 * | 11/1993 | Babka | 426/293 |
| 5,266,340 * | 11/1993 | Samson | 426/293 |
| 5,770,252 * | 6/1998 | McEwen | 426/303 |
| 6,139,887 * | 10/2000 | Coument et al. | 426/99 |

FOREIGN PATENT DOCUMENTS

| | | |
|---|---|---|
| 32 38317 | 4/1984 | (DE) . |
| 091 497 | 10/1983 | (EP) . |

OTHER PUBLICATIONS

Derwent Acc No. 1992–355335 Abstract.*
Baldwin 1997 Use of Lepeds in Coatings for Foods Food Tech 51(6) 56–62, 64.*
European Search Report in the application of 98 30 5344.
Patent Abstract of Japan JP 62 048342.

* cited by examiner

*Primary Examiner*—Carolyn Paden
(74) *Attorney, Agent, or Firm*—James J. Farrell

(57) ABSTRACT

In order to provide a food product which has all the ingredients necessary for cooking, breadcrumbs are applied to a food fillet such as fish, oil being subsequently applied to the food portion after which the product is frozen. Preferably oil is applied at a first temperature in a first step and at a higher temperature in a second step. As a result, it is possible to produce a frozen food product comprising a food portion coated with a coating comprising oil/fat and particulate coating material, the weight ratio of oil/fat to particulate coating material being greater than 2:1, and the food product having greater than 10% by weight of oil/fat. Substantially all of the particulate coating material is coated with oil/fat.

11 Claims, No Drawings

FROZEN FOOD PRODUCT

BACKGROUND OF THE INVENTION

The present invention relates to a frozen food product and a method of manufacturing it.

It is known to coat food portions, such as fillets of fish or meat portions, with a relatively thick coating (several millimeters) of batter and crumb material, such as breadcrumbs. The coating is then typically "fixed" for example by frying, before the product is frozen. The resulting product is acceptable to the consumer as an easily cooked meal. However, the coating masks the natural appearance of food portions from which the product is made.

JP 62048342 provides an example of a product which has a fixed batter/crumb coating which is achieved by exposing the coated food material to conditions of heated steam and dry heat until the core temperature reaches greater than or equal to 80° C. Whereafter the coated food material is covered with oil and frozen.

A thick crumb/batter coating makes the product relatively straightforward for the consumer to cook, however the applicants have identified a desire to reduce the dominance of the coating layer in such food products so that the natural appearance and flavours of the food portions concerned can be more readily appreciated.

U.S. Pat. No. 2,910,370 and U.S. Pat. No. 3,078,172 describe typical conventional batter coated products wherein the composition of the batter allows consumer preparation without any further addition of oil.

In seeking to produce lightly coated food products that retain a more natural appearance and flavour it is desirable to produce particulate-coated products that do not involve the application of a conventional batter.

The relatively straight forward consumer cooking requirements of thick crumb/batter coated products can be contrasted with those of lightly coated food portions sought by the present invention which typically require more attention during consumer preparation, for example in selecting the quantity of oil for cooking and more generally in the care required when cooking.

U.S. Pat. No. 4,199,603 describes a process for preparing coated comestibles for microwave cooking. This product would not be suitable for frying without additional oil, as it does not contain sufficient oil. A frozen food portion is first of all coated with oil and then with a crisp, relatively dry particulate. This particulate is not itself coated with further oil. There is no stated intention to have as much as 10 wt% based upon the whole product of oil/fat.

EP-A-0091497 (Frisco-Findus) discloses a process for preparing a coated frozen fish product wherein a frozen fish piece is initially battered, then breaded a first time, thereafter coated with an edible fat in liquid form and finally breaded a second time before being frozen. The resulting product is not suitable for cooking by frying. Although oil contents of up to 15% by weight based upon the final product are in theory possible, all of the examples show oil contents below 10% by weight. Further, the coating is not itself suitable for cooking by frying, as not all of the breadcrumbs are completely covered in oil. It is not in fact the intention to ensure that an adequate amount of oil is retained on the fish piece, as excess oil is blown off after the oil application step.

It is an object of the present invention to provide a lightly coated frozen food product and method for manufacturing it, which product is relatively simple to cook by conventional methods, in particular by frying.

The inventors have realised that it is possible to provide a frozen food product which incorporates a light coating of particulate material and all the other ingredients necessary for conventional cooking, such as frying, including all the oil necessary.

BRIEF SUMMARY OF THE INVENTION

The present invention provides a process for the production of a frozen food product comprising the steps of:

providing a food portion, applying a particulate coating material to the food portion to form a layer of no more than 2 mm in thickness, subsequently applying oil/fat to the food portion, and freezing the product, wherein the weight ratio of oil/fat to particulate coating material is greater than 1:2, preferably greater than 1:1, and wherein the oil/fat is present at a level greater than 10 wt%, there being no fixing step between the step of applying the particulate coating material and oil/fat and the step of freezing the product, and wherein substantially all the particulate coating material is coated with oil/fat.

DETAILED DESCRIPTION OF THE INVENTION

The present invention further provides a frozen food product comprising a solid food portion coated with an unfixed coating comprising particulate coating material and oil/fat, wherein the weight ratio of oil/fat to particulate coating material is greater than 2:1, wherein there is greater than 10% by weight of oil/fat and wherein substantially all the particulate coating material is coated with oil/fat.

As it is the intention to provide a lightly coated food product, it is not required to apply a thick coating of batter and fix or set the batter. There is no fixing or setting step between the application of oil and freezing in the present invention. The coating is accordingly unfixed, and contains liquid components which are mobile at room temperature, e.g. the oil/fat. The coating itself remains liquid, semi-liquid or easily deformable at room temperature unlike set or fixed coatings.

The present invention is applicable to food products based upon fish, poultry, other meat, raw or cooked vegetables etc. However, it is particularly suitable for food products based upon fillets of fish.

Preferably, the food portion comprises a naturally shaped component. For example, it may comprise a fish fillet. Most preferably, it comprises a fillet produced by trimming and cutting a fish and not having been substantially reshaped.

The fish may comprise plaice

The particulate material may be any suitable edible coating material, for example, it may comprise crumbs, such as breadcrumbs or Japanese breadcrumbs. Alternatively, it may comprise flour or a mixture of flour and crumbs. The particulate coating material may also contain seasoning, flavourings and herbs. Preferably, the particulate material contains substantially no batter.

The food portion may be supplied in frozen form. It may be substantially thawed, at least on the surface (preferably over the whole of its surface), by air or other heating means.

Preferably, at least the surface of the food portion used is not frozen during the procedure of the present invention. If the surface food portion is frozen, penetration of the oil/fat onto the surface can be inhibited to a local increase in the viscosity of the oil/fat where the oil/fat is cooled. Preferably, the surface of the food portion is at a temperature in the region of 10–15° C.

It is preferred for the surface of the food portion to be thawed to a depth of not more than 1 mm. It is preferred for at least part of the food portion to remain frozen to preserve its keeping qualities.

An adhesive composition may be applied to the surface of the food portion before the particulate coating material is applied.

The particulate material can be applied in a single step or it may be applied in a plurality of steps.

After at least one layer of particulate material has been applied, oil and/or fat is applied. There may be further applications of particulate material after at least one layer of oil has been applied. Different types of particulate coating may be applied at different times. For example, a base coating comprising flour and/or breadcrumbs may be applied first. At a later stage, particulate material comprising e.g. parsley and seasoning may be applied. The particulate material layer may be no more than 2 mm thick, preferably no more than 1 mm thick.

There should be no layer of particulate material which is not coated with oil/fat. This is to prevent burning and poor cooking.

This is best achieved by ensuring that less than 1%, preferably less than 0.5% by weight, more preferably substantially 0% by weight of particulate coating material based upon the final product is added to the product between the last oil/fat application step and freezing.

It is, of course, possible for small areas of particulate coating material to remain uncoated due to small imperfections in the coating layer. This may be the result if a highly viscous oil/fat is used, as discussed below. Such imperfections may be tolerable if they do not affect the appearance of the product when cooked too much.

The oil/fat used may be any suitable edible oil or fat or mixture thereof. The oil/fat must be substantially liquid at the temperature of the application step. Typically, the viscosity characteristics of such oil/fat are Newtonian.

In order to allow a sufficiently large quantity of oil to be adhered to the surface of the food portion, the oil should have a viscosity in the range 10,000 to 20,000 cPs at 0–20° C.

The viscosity of the oil/fat will depend upon the temperature and the composition. Preferred compositions will be described below. Suitably, there is an application step at a temperature in the region of 0–20° C., preferably 5–16° C. In this step, at least 10% by weight based upon the finished product, preferably greater than or equal to 15% by weight based upon the finished product of oil/fat is added.

The oil/fat layer can be added in a single step at a single temperature. However, the inventors have discovered that much better control of the oil application step can be obtained if oil/fat is applied in two steps. A different oil/fat composition can be used in the different steps. The different steps can be carried out at different temperatures. This allows different viscosities of oil to be used in two different steps. For example, in the first step a relatively viscous oil can be used which achieves a thick coating, but which can leave a number of gaps. In a subsequent step an oil of lower viscosity can be used which does not add so much oil, but which fills any gaps effectively.

It is possible for the first step to be carried out at a higher temperature than the second step but, as will be explained below, it is most preferred for the first step to be carried out at a lower temperature.

The appearance and quality of the food products can be improved if the oil is added in a first step at a first temperature and in a second step, at a higher temperature.

In the first step, the oil/fat is at a lower temperature and has a higher viscosity. This allows a relatively thick coating of oil/fat to be retained on the food product, as the boundary layer of oil/fat on the surface is deeper and run off is less easy or fast.

In the second step of oil/fat application, the viscosity of the oil/fat is comparatively low and even covering of the food product can be obtained. The lower viscosity of the oil/fat allows it to enter relatively small spaces on the surface of the food product relatively quickly.

It is found that the process of the present invention allows much higher oil/fat levels in the frozen food product than is possible with the prior art, without employing large quantities of particulate coating material.

The inventors have discovered that it is particularly beneficial in a two step process to use a single oil/fat mixture which is liquid at the temperature of both application steps. Preferably, the oil/fat mixture has a viscosity which, at least in the region of the temperatures of the two steps, is substantially linearly dependent upon temperature. This allows the depth and rate of application to be carefully controlled by varying the temperature. Accordingly, the desired thickness and quantity of oil/fat can be controllably applied to the food portion.

In order to provide an oil/fat mixture having a substantially linear temperature dependence in the range of 0–50° C., a mixture of for example extra virgin olive oil and palm oil (unhardened) may be used. Preferably, the weight ratio of extra virgin olive oil to palm oil is in the region of 60:40–40:60, more preferably in the region of 45:55–55:45.

The product of the invention preferably has greater than 50% by weight of the solid food portion, more preferably greater than 55% by weight of the solid food portion, based upon the complete food product. Preferably, there is greater than 5% by weight based upon the total product of particulate coating material, more preferably greater than 10% by weight, most preferably greater than 12% by weight particulate material. Preferably, there is greater than 15%, most preferably greater than 20% by weight oil/fat.

Preferably, with the two step process, the weight ratio of oil/fat to particulate coating material can be greater than 2:1.

By way of example only, a typical product of a two step process of the present invention may comprise a 45 g fillet of fish covered with a coating comprising 10 g of breadcrumbs and 20 g of oil/fat mixture.

The first oil application step preferably takes place at a temperature in the region of 0–20° C., preferably 5–16° C. This step may be carried out in a conventional battering machine having active temperature control. The oil/fat is preferably of viscosity not lower than 10,000 cPs, preferably in the range 10,000 to 20,000 cPs in the first step.

During the second oil application step, the temperature is preferably in the range 25–50° C., most preferably 30–40° C. In this step, the uptake of oil measured by increase in weight of the food portion is preferably in the range 5–10% by weight.

The second application step can be carried out in a conventional battering machine. The second application step may take in the region of 0.5–5 minutes, most preferably around 1–2 minutes. The oil/fat is preferably of viscosity up to 10,000 cPs, preferably 2,000 to 10,000 cPs in the second step.

After the oil and particulate material have been applied to the food portion, it may be packaged and frozen. No heating step or coating-fixing step is applied in the present invention. Such a step would necessarily involve heating or changing the state of the food portion which would lead to disruption of the oil layer applied to the food portion.

The freezing step has the effect of making the oil solid and immobile, so that it is not lost.

The food product may be frozen in a conventional blast, plate or tunnel freezer to a temperature in the region of −45 to −20° C.

The food product may be packaged in boxes, bags, flow wrap, shrink wrap etc.

It may be possible to determine whether the product has been produced with a heating step between application of coating material and oil and freezing be inspecting the particles of coating material. A heating step will effect the properties of the particles to some extent—for example by browning, toasting, or expanding them. There will also be effects on the oil e.g. entry of bubbles from the powder coating and underlying fish.

The present invention allows a food product to be produced which may be removed from packaging and directly heated to cook without addition of any further ingredient. For example, the food product may be adapted for frying.

EXAMPLES

The present invention will be described by way of example only with reference to the following examples.

A food product was produced by taking a 45 g frozen fillet of plaice of natural shape and allowing it to surface thaw to a depth of 1.0 mm. Subsequently, particulate coating material comprising 10 g of crumbs was applied by dusting to the surface of the fillet.

Subsequently, an oil/fat mixture comprising 49.3 wt% extra virgin olive oil, 49.3 wt% palm oil and 1.65 wt% flavourings was applied to the coated fillet in two steps. The first step was carried out in a conventional battering machine of waterfall or immersion type at a temperature of 0 to 10° C. In a second step, the same oil mixture was applied to the partially oiled food product in the same machine at a temperature of 10 to 30° C.

As a result, the completed product had a weight of approximately 75 g. The product was subsequently frozen in a standard plate freezer.

In order to test the quality of the product, the fillet was thawed and placed in a frying pan without any subsequent addition of oil or other ingredients. The fillet was cooked over a low flame for about 8 minutes (4 minutes each side). The resulting cooked product has a light crust of pleasant appearance on both sides. Appearance and taste were judged to be excellent.

What is claimed is:

1. A process for the production of a frozen food product, comprising the steps of:

providing a food portion, applying a particulate coating material to the food portion to form a layer of no more than 2 mm in thickness, subsequently applying oil/fat to the food portion in at least two steps, and freezing the product, wherein the weight ratio of oil/fat to particulate coating material is greater than 1:2, and the frozen food product comprises greater than 10% by weight of the oil/fat, there being no fixing step between the step of applying the oil and the freezing step and wherein substantially all of the particulate coating material is coated with oil/fat.

2. A process according to claim 1, wherein the food portion comprises a fish fillet.

3. A process according to claim 1, wherein oil/fat is applied to the food portion at a first temperature in a first step, and in a second step at a higher temperature than the first step.

4. A process according to claim 3, wherein a single oil/fat mixture is used for both oil/fat application steps, which is liquid at both of the temperatures of the application steps.

5. A process according to claim 4, wherein the oil/fat mixture has a viscosity which, in the region of the temperatures of the two oil/fat application steps, is substantially linearly dependent upon temperature.

6. A process according to claim 5, wherein the oil/fat mixture comprises a mixture of extra virgin olive oil and unhardened palm oil, at a weight ratio of 60:40–40:60.

7. A process according to claim 3, wherein the temperature of the first oil/fat application step is in the region 0–20° C.

8. A process according to claim 3, wherein the temperature of the second oil/fat application step is in the region 25–50° C.

9. A frozen food product comprising a solid food portion, coated with an unfixed coating comprising particulate coating material and oil/fat, wherein the weight ratio of oil/fat to particulate coating material is greater than 2:1 and the food product comprises greater than 10% by weight of oil/fat, and wherein substantially all of the particulate coating material is coated with oil/fat.

10. A food product according to claim 9, wherein the oil/fat is an oil/fat mixture comprising extra virgin olive oil and palm oil at a weight ratio of 60:40 to 40:60.

11. A food product according to claim 9, wherein the particulate coating layer is no more than 2 mm in thickness.

* * * * *